Aug. 12, 1930.   G. E. WHITLOCK   1,772,530
CLEANING APPARATUS
Original Filed Jan. 3, 1922   3 Sheets-Sheet 1
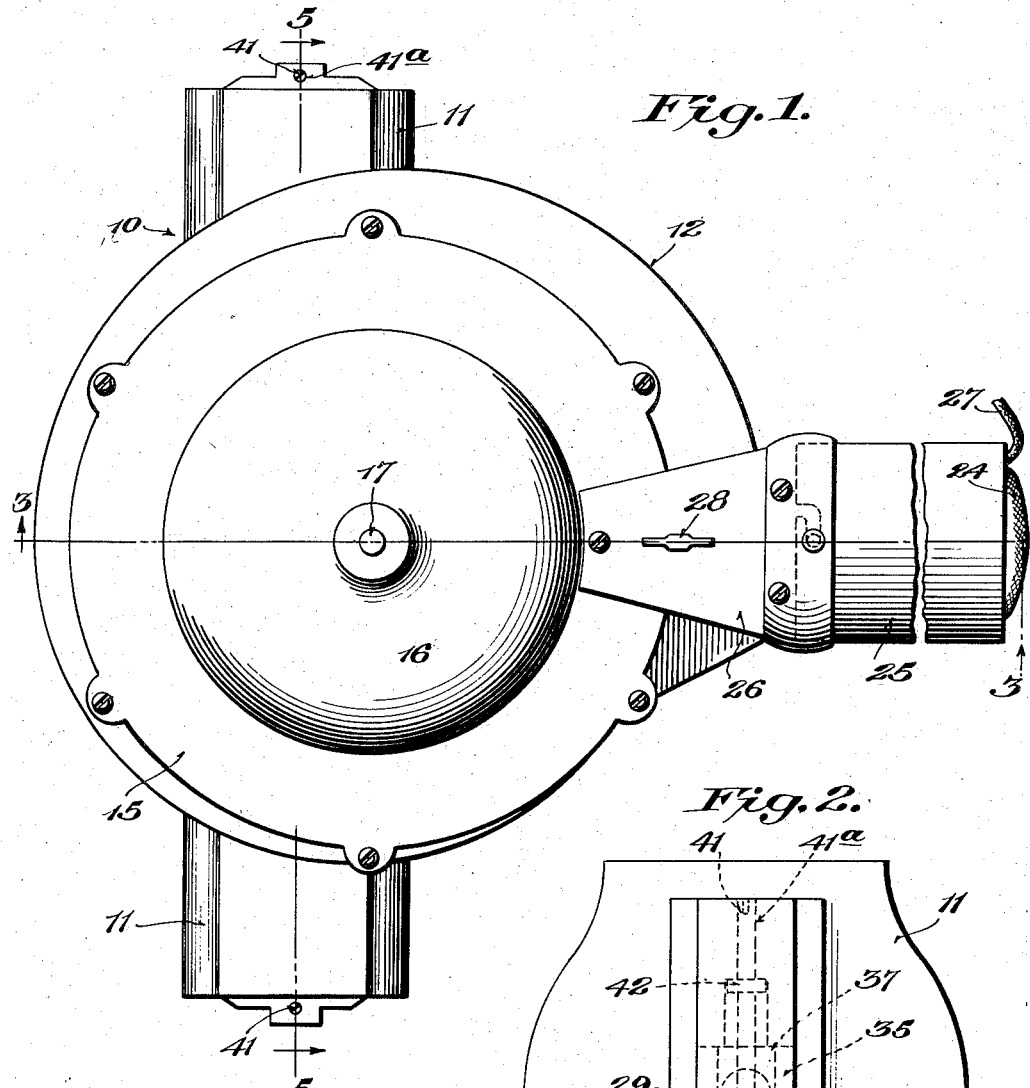
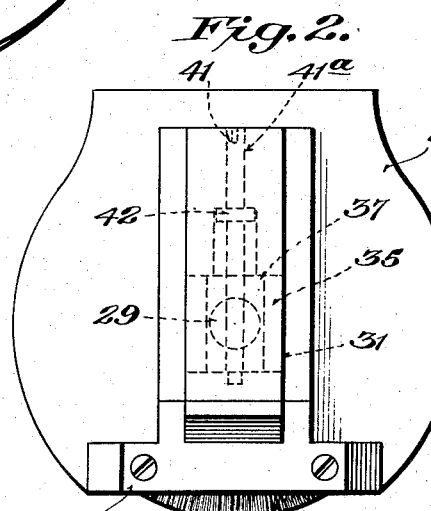

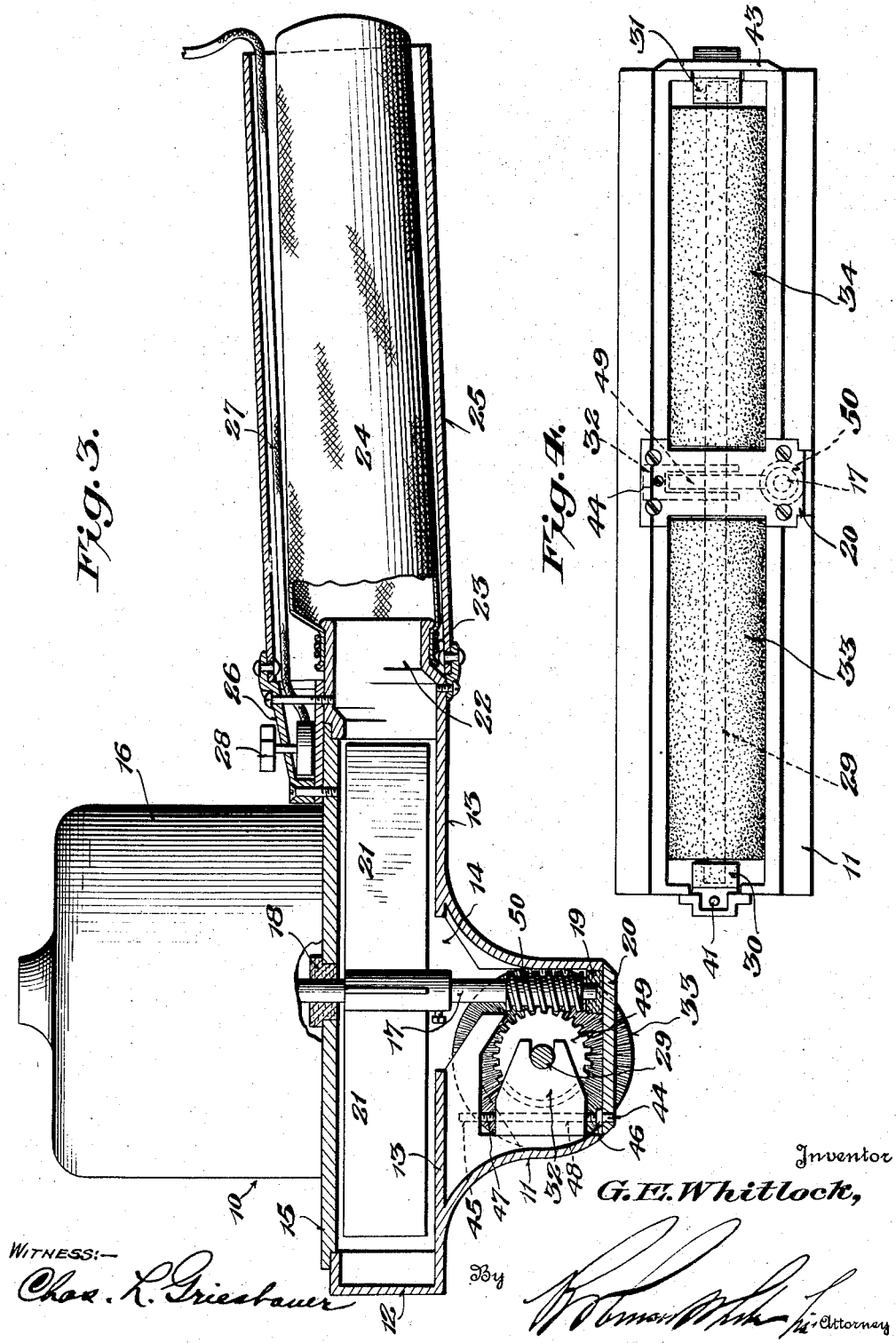

Aug. 12, 1930. G. E. WHITLOCK 1,772,530
CLEANING APPARATUS
Original Filed Jan. 3, 1922   3 Sheets-Sheet 3
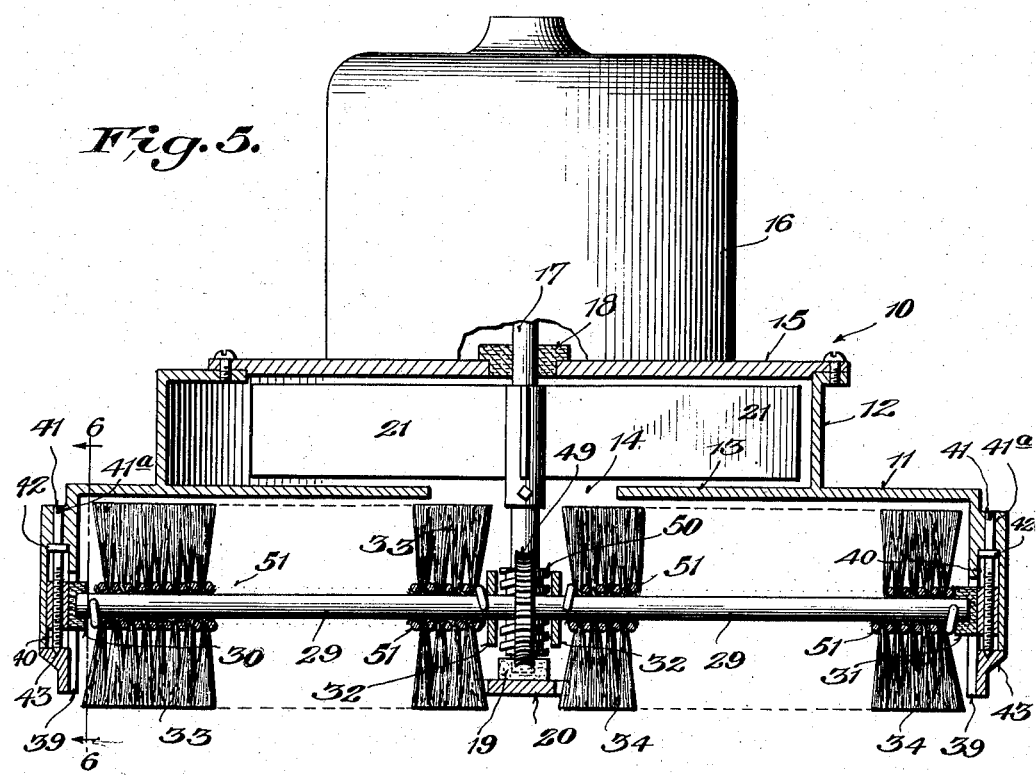
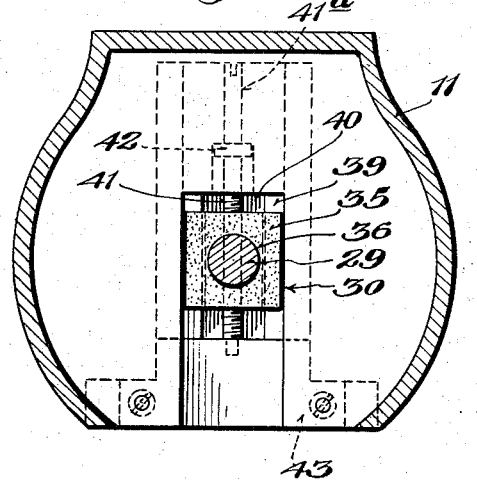
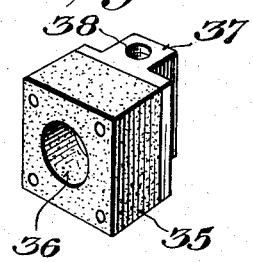

Patented Aug. 12, 1930

1,772,530

UNITED STATES PATENT OFFICE

GEORGE E. WHITLOCK, OF RENO, NEVADA, ASSIGNOR OF ONE-HALF TO MATTHEW KYLE, OF RENO, NEVADA

CLEANING APPARATUS

Application filed January 3, 1922, Serial No. 523,646. Renewed April 4, 1929.

This invention relates generally to cleaning apparatus and relates more particularly to cleaning apparatus of the self-contained vacuum type.

One of the objects of the present invention is to provide cleaning apparatus light in weight and of simple compact construction, so that it may be easily lifted and held in the hand while being used.

Another object of the invention is to provide improved brushing mechanism and improved means for adjustably mounting the brushing mechanism.

Other objects and advantages will be clear from the following description.

Broadly stated, the cleaning apparatus embodying my invention comprises a body or casing, means for causing dust and dirt to enter said body or casing, a dust and dirt receiving receptacle secured to the body or casing and means forming a handle enclosing said receptacle.

More specifically described, my invention embodies a casing, suction-production means, driving means for said suction-production means, brushing means, means for adjustably mounting said brushing means, means transmitting motion from said driving means to said brushing means, a dust and dirt receiving receptacle secured to the casing and means forming a handle enclosing said receptacle.

The accompanying drawings illustrate cleaning apparatus embodying the principle of my invention, but it is to be understood that the specific embodiment here chosen for purposes of illustration is merely one form typical of the broad invention and is to be taken as illustrative and not restrictive.

In the drawings,

Fig. 1 is a top plan view of cleaning apparatus embodying my invention;

Fig. 2 is an enlarged detail view showing an end of the nozzle part of the body or casing;

Fig. 3 is a sectional view taken on the line 3—3 of Fig. 1 looking in the direction of the arrows;

Fig. 4 is a bottom plan view of the nozzle part of the casing, one of the end bottom plates being left off;

Fig. 5 is a sectional view taken on line 5—5 of Fig. 1 looking in the direction of the arrows;

Fig. 6 is an enlarged sectional view taken on line 6—6 of Fig. 5 looking in the direction of the arrows; and Fig. 7 is an enlarged detail of one of the end bearings.

Referring to the drawings, 10 indicates generally the casing or body of my improved cleaning apparatus. This casing comprises a collecting nozzle 11, in this instance made integral with the casing, which is adapted to be applied to the surface to be cleaned and a substantially spiral suction or fan chamber 12 disposed adjacent to said nozzle and communicating therewith. In the present example, the bottom wall 13 of the suction chamber 12 forms the top wall of the nozzle 11, the interior of the nozzle and the suction chamber communicating through opening 14 provided in the bottom wall of the suction chamber. The nozzle is elongated transversely of the apparatus, thereby affording a wide working mouth, the ends of the nozzle projecting laterally much farther than the fan chamber. A removable cover plate 15 carrying a motor 16 forms the top wall of the fan chamber. The shaft 17 of the motor 16 extends through a bearing 18 in the cover plate 15 into the fan chamber 12, passing through the communicating aperture 14 into nozzle 11, the extending end of the shaft being supported in a thrust bearing 19 carried by a plate 20 which bridges the mouth of the nozzle 11. Mounted on the shaft 17 to rotate in the fan chamber 12 is the fan 21. When the fan rotates, it creates a suction through the nozzle, discharging through the outlet 22 provided in the periphery of the fan chamber. It is to be observed that in the present instance, the periphery of the fan chamber is spiral in shape, so that a passage gradually increasing in size is formed between the path of the fan blades and the periphery of the fan casing, the passage being largest at the point where it opens into the discharge opening 22, whereby insuring maximum operating efficiency. Removably secured to the outlet 22 by any suitable means 23 is a dust and dirt receiving receptacle 24. This may be made of any desired size and shape and of any suitable material, but I prefer to make it of closely woven porous cloth in the shape of a tubular bag and comparatively small in size so that it can be fitted within means forming an operating handle for the apparatus. In the present instance the handle comprises a hollow tubular member 25, which may be made of hard rubber, fibre, etc., removably secured to a casting 26 secured to the casing adjacent the outlet 22. The handle 25 is made slightly larger than the dust collecting or settling bag 24 to allow the electric wires 27 which bring electric current to the motor to be placed therein. The wires lead to a switch 28 located in the casting 26. It will be readily seen that I have provided a very simple, compact arrangement of parts and because of my novel combination of handle and dust collecting receptacle, I have not only arranged two parts in the space of one, but have also obviated the usual flabby dust-settling bag so objectionable because it interferes with the free use of apparatus of this general type. It will be observed that in my improved apparatus, the settling bag is shielded and protected and takes up no more space than that required for the ordinary handle.

In order to increase the efficiency of my apparatus, I have provided means for agitating or stirring-up the dust or dirt so that after my apparatus has gone over a surface, it is left clean and substantially free from dust and dirt. The agitating or stirring mechanism in the present instance includes a shaft 29 supported at its ends by adjustable bearings 30 and 31 and at the center by adjustable bearing 32 mounted in the nozzle part of the casing. The shaft 29 carries two brush sections 33 and 34 spaced on the shaft to leave a space at the center of the shaft for the center bearing and support 32 and for the mechanism for driving or rotating the brush. In the example illustrated, each end bearing 30 or 31 comprises a bearing block 35, which may be made of fibre or other suitable material, having a recess or aperture 36 for rotatably supporting an end of the brush shaft. This bearing block is removably secured to a bracket 37 having a reduced portion provided with an internally threaded aperture 38 which extends at right angles with respect to the aperture 36. Each bearing block is slidably mounted in a slot 39 provided in each end of the nozzle part of the casing, the reduced portion of the bracket 37 sliding in a reduced portion 40 of slot 39. Each bearing block may be adjusted and held in adjusted position in the slots by means of a pin 41 having an externally threaded portion which threads into the internally threaded aperture 38 provided in each bearing bracket 37, one end of the pin fitting in a socket or aperture 41ª provided in the casing. A collar or shoulder 42 on the pin prevents it from slipping through the socket or aperture in the casing. The other end of the pin is rotatably supported in a socket provided in a removable bottom plate 43, said plate forcing the shoulder of the pin against the socket and holding the pin so that one end is flush with or a little above the surface of the casing. This end may be slotted for reception of a screw-driver or similar tool or may be roughened to facilitate turning by hand when it is desired to adjust the position of the brush so that it extends more or less out of the nozzle. The center adjustable bearing or support 32 comprises a substantially U-shaped bracket, the ends of the arms of the bracket being slotted to receive and rotatably support the shaft 29. The bracket is adjustably supported to slide along one wall of the nozzle by means of a pin 44, one end of which is rotatably mounted in a socket 45 provided in the casing, the other end being mounted in a socket or aperture provided in the plate 20, a collar 46 preventing the pin from sliding through the aperture. The pin has an externally threaded portion 47 which threads into an internally threaded aperture 48 in the base of the U-shaped bracket 32. The end of the pin which extends into the socket or aperture in the plate 20 is preferably flush with the latter and is preferably slotted or otherwise formed so that it may be engaged and turned by a screw-driver or similar tool to adjust the brush so that it extends more or less out of the nozzle.

I have provided means for driving or rotating the brushing mechanism which will not interfere with the adjustment of the brush and which need not be disconnected to adjust the latter. Preferably mounted on the shaft 29 between the arms of the U-shaped bracket 32 is a worm wheel 49 which meshes with a worm 50 secured to the motor shaft 17. It will be seen that I have provided common mechanism for driving the suction-production means and the brushing or agitating means.

While it is evident that a brush of any suitable construction may be used in my apparatus, the brush construction shown by me is preferred. In my improved construction, the bristles of the brush are clamped and held between the coils of wire 51 wound close together around the shaft 29, the ends of the wire extending through holes drilled in the shaft and riveted therein.

The operation and advantages of my apparatus are so obvious as to require no detailed discussion. When the current is turned on, the motor operates the brushing mechanism and the suction producing means. The dust and dirt raised by the brush is sucked into the nozzle and delivered through the suction chamber into the dust and dirt collecting receptacle or bag 24. When the bag begins to fill up, the hollow handle is disconnected and the dust bag removed and emptied after which the bag and handle are replaced.

It will be seen that I have provided extremely light, compact, portable cleaning apparatus. The apparatus because of its small size and weight is especially adapted to clean clothes, but this is only one of many uses to which the apparatus may be put.

What I claim is:

1. Cleaning apparatus comprising a casing, suction producing means, driving means therefor including a motor and a drive shaft, a rotary brush arranged transversely of said drive shaft, means for adjustably supporting said brush at its ends and intermediate its ends and a positive driving connection between said drive shaft and said brush.

2. Cleaning apparatus comprising, a casing, suction producing means, brushing means comprising a shaft provided with brush sections, means intermediate said brush sections and at the ends of the shaft for adjustably supporting the shaft and common means for positively driving said brush and said suction-producing means.

3. Cleaning apparatus comprising a casing, suction-producing means, brushing means comprising a shaft provided with brush sections, adjustable bearings intermediate said brush sections and at the ends of the shaft for adjustably supporting said brushing means and means for driving said brushing means comprising a worm wheel mounted on the brush shaft intermediate the brush sections, a motor shaft and a worm mounted on said shaft and in driving engagement with the worm wheel on said brush shaft.

4. In cleaning apparatus including a casing provided with a collecting nozzle, suction producing means associated with said casing, driving means for said suction producing means, said driving means including a motor and a drive shaft, a rotary brush arranged transversely of said drive shaft, and means including a positive driving connection between the drive shaft and the brush, a dust and dirt receiving receptacle secured to the casing, said casing lying between the dust and dirt receiving receptacle and the nozzle, and a hollow handle opening into said casing and enclosing said receptacle.

5. In cleaning apparatus including a casing provided with a collecting nozzle, suction producing means associated with said casing, and driving means for said suction producing means, a dust and dirt receiving receptacle secured to the casing, said casing lying between the dust and dirt receiving receptacle and the nozzle, and a hollow handle opening into said casing and enclosing said receptacle.

6. In cleaning apparatus including a casing provided with a collecting nozzle and suction producing means associated with said casing, a dust and dirt receiving receptacle secured to the casing, said casing lying between the dust and dirt receiving receptacle and the nozzle, and a hollow container opening into said casing and enclosing said receptacle, said container being relatively narrow so that it may be conveniently grasped by one hand of an operator, thereby to serve as a handle for holding and manipulating said cleaning apparatus.

7. In cleaning apparatus which includes a casing provided with a collecting nozzle, a suction producing means associated with said casing and wherein a dust and dirt receiving receptacle is secured to the casing, said casing lying between the dust and dirt receiving receptacle and the nozzle, a hollow container opening into said casing and enclosing the dust and dirt receiving receptacle, said container being relatively narrow so that it may be used as a handle for manipulating the cleaning apparatus.

In testimony whereof I hereunto affix my signature.

GEORGE E. WHITLOCK.